US010915635B2

(12) United States Patent
Hars

(10) Patent No.: US 10,915,635 B2
(45) Date of Patent: Feb. 9, 2021

(54) COUNTERMEASURES TO FREQUENCY ALTERATION ATTACKS ON RING OSCILLATOR BASED PHYSICAL UNCLONABLE FUNCTIONS

(71) Applicant: THE BOEING COMPANY, Chicago, IL (US)

(72) Inventor: Laszlo Hars, Lafayette, CO (US)

(73) Assignee: THE BOEING COMPANY, Chicago, IL (US)

(*) Notice: Subject to any disclaimer, the term of this patent is extended or adjusted under 35 U.S.C. 154(b) by 235 days.

(21) Appl. No.: 15/853,181

(22) Filed: Dec. 22, 2017

(65) Prior Publication Data
US 2019/0384915 A1 Dec. 19, 2019

(51) Int. Cl.
G06F 21/57 (2013.01)
G06F 21/74 (2013.01)
H04L 9/32 (2006.01)
G06F 9/445 (2018.01)

(52) U.S. Cl.
CPC ............ G06F 21/575 (2013.01); G06F 21/74 (2013.01); H04L 9/3236 (2013.01); H04L 9/3278 (2013.01); G06F 9/445 (2013.01); G06F 2221/2105 (2013.01); G06F 2221/2123 (2013.01)

(58) Field of Classification Search
CPC ........ G06F 21/575; G06F 21/74; G06F 9/445; G06F 2221/2105; G06F 2221/2123; H04L 9/3236; H04L 9/3278
See application file for complete search history.

(56) References Cited

U.S. PATENT DOCUMENTS

2009/0282259 A1 11/2009 Skoric
2010/0031065 A1* 2/2010 Futa ............... H04L 9/0866
 713/194
2015/0269378 A1 9/2015 Falk
2017/0180137 A1* 6/2017 Spanier ............ H04L 9/3236

FOREIGN PATENT DOCUMENTS

EP 2 081 170 A1 7/2009
EP 2 579 499 A1 4/2013

OTHER PUBLICATIONS

Extended European Search Report; European Application No. 18213284.4-1218; dated May 10, 2019.
Office Action from European Patent Appl. No. 18213294.4, dated Apr. 22, 2020.

* cited by examiner

Primary Examiner — Shin-Hon (Eric) Chen
Assistant Examiner — Jessica J South
(74) Attorney, Agent, or Firm — Womble Bond Dickinson (US) LLP

(57) ABSTRACT

A system for providing security in a computer system is provided. The system includes a physical unclonable function (PUF) device and one or more logic circuits. At startup of the computer system, the logic circuits call the PUF device a preset plurality of times with an identical input value to generate a plurality of PUF values that are candidate identifiers of an integrated circuit. The logic circuits apply a hash function to the candidate identifiers to produce respective hash values. The logic circuits also access a reference hash value from a non-volatile memory and verify all of the respective hash values using the reference hash value. The logic circuits further enable the computer system to operate in a first mode or a second mode based on the verification results.

20 Claims, 3 Drawing Sheets

COUNTERMEASURES TO FREQUENCY ALTERATION ATTACKS ON RING OSCILLATOR BASED PHYSICAL UNCLONABLE FUNCTIONS

TECHNOLOGICAL FIELD

The present disclosure relates generally to providing security in a computer system, in particular, to providing security in a computer system using countermeasures to frequency alteration attacks on ring oscillator based physical unclonable functions (PUFs).

BACKGROUND

A PUF device is a device that is easy to evaluate but hard to predict. A PUF device must be easy to make but practically impossible to duplicate, even given the exact manufacturing process that produced it. In this respect a PUF device is the hardware analog of a (cryptographic) one-way function. A PUF device can be used to generate a chip-ID, which is used, e.g., for secure device identification, or as a component of a root cryptographic key in a computer system for information security.

A PUF device can be built with multiple identically designed ring oscillators. However, a ring oscillator based PUF device may have leakage of oscillator signals on side channels, and frequencies of the ring oscillators may be altered by frequency alteration attacks. Certain types of simple, non-invasive physical attacks can alter the frequencies of a ring oscillator or small groups of ring oscillators of the PUF device. An unauthorized third party can observe if an attack to the ring oscillators of the PUF device prevents the computer system to work properly. By repeating such attacks a sufficient number of times, and by observing the startup behavior of the computer system, an unauthorized third party may be able to recreate the PUF values (e.g., chip-IDs) generated by the PUF device and thus harm the information security of the computer system.

Existing solutions to protect a ring oscillator based PUF device from frequency alteration attacks include using physical protection such as metal shields or internal digital or analog filters. The existing solutions can be used to prevent information leakage on side channels and signal injection attacks. However, the existing solutions are expensive, ineffective, fragile and easy to circumvent.

Therefore it would be desirable to have a system and method that take into account at least some of the issues discussed above, as well as other possible issues.

BRIEF SUMMARY

Example implementations of the present disclosure are directed to providing security in a computer system using countermeasures to frequency alteration attacks on ring oscillator based PUFs. In contrast to the existing solutions, example implementations provide protocol level, algorithmic countermeasures to frequency alteration attacks. The protocol level, algorithmic countermeasures can confuse the unauthorized third party such that the unauthorized third party cannot easily observe if an attack to the ring oscillators of the PUF device prevents the computer system to work properly. Therefore, the unauthorized third party cannot easily know if the attack is successful or not. These countermeasures only need changes in the control software (firmware), thus no extra hardware is needed. Thus, these countermeasures are inexpensive and easy to implement and evaluate.

The present disclosure thus includes, without limitation, the following example implementations.

Some example implementations provide a method of providing security in a computer system. The method is implemented in a system, the system being implemented in an integrated circuit and comprising a PUF device, the method comprising, at startup of the computer system: calling the PUF device a preset plurality of times with an identical input value to generate a plurality of PUF values that are used as candidate identifiers of the integrated circuit; applying a hash function to the candidate identifiers to produce respective hash values; accessing a reference hash value from a non-volatile memory, the reference hash value being from application of the hash function to an accepted identifier of the integrated circuit; verifying all of the respective hash values using the reference hash value; and enabling the computer system to operate in a first mode when a respective hash value of the respective hash values is verified, or otherwise enabling the computer system to operate in a second mode when none of the respective hash values is verified, the respective hash value being for a candidate identifier of the candidate identifiers that matches and is thereby construed as the accepted identifier.

In some example implementations of the method of any preceding example implementation, or any combination of preceding example implementations, the PUF device includes a plurality of ring oscillators, and the input value of the PUF device includes a sequence of pairs of identifiers of ring oscillators of the plurality of ring oscillators, and wherein calling the PUF device includes for each of the preset plurality of times, applying the identical input value in which each pair of identifiers in the sequence causes the PUF device to compare oscillation frequencies of a respective pair of the ring oscillators and output a bit value indicating which is larger, the bit value being one of a sequence of bit values output over the sequence of pairs of identifiers, the sequence of bit values being one of the plurality of PUF values corresponding to the input value.

In some example implementations of the method of any preceding example implementation, or any combination of preceding example implementations, verifying all of the respective hash values includes for each hash value of the respective hash values, comparing the hash value to the reference hash value to determine whether the hash value matches the reference hash value and the hash value is thereby verified.

In some example implementations of the method of any preceding example implementation, or any combination of preceding example implementations, enabling the computer system to operate in the first mode includes causing the computer system to boot up in the first mode in which the computer system is caused to at least: load firmware and data into memory of the computer system; perform data authentication on the firmware and data using the accepted identifier; and perform a decrypt operation on the firmware and data with a key.

In some example implementations of the method of any preceding example implementation, or any combination of preceding example implementations, enabling the computer system to operate in the second mode includes causing the computer system to boot up in the second mode in which the computer system is caused to at least: load the firmware and data into the memory of the computer system; perform the data authentication on the firmware and data without the accepted identifier, and ignore any errors in the data authentication; and perform the decryption operation on the firmware and data with a preset invalid key.

In some example implementations of the method of any preceding example implementation, or any combination of preceding example implementations, the accepted identifier is used as a component of a root cryptographic key of the computer system.

In some example implementations of the method of any preceding example implementation, or any combination of preceding example implementations, the first mode is a normal operation mode.

In some example implementations of the method of any preceding example implementation, or any combination of preceding example implementations, wherein the second mode is a fake operation mode that mimics the normal operation mode.

In some example implementations of the method of any preceding example implementation, or any combination of preceding example implementations, enabling the computer system to operate in the second mode includes causing the computer system to boot up in the second mode in which the computer system is caused to report a security error to a user of the computer system after a preset delay.

Some example implementations provide the aforementioned system for providing security in a computer system, the system comprising one or more logic circuits configured to at least perform the method of any preceding example implementation, or any combination of preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
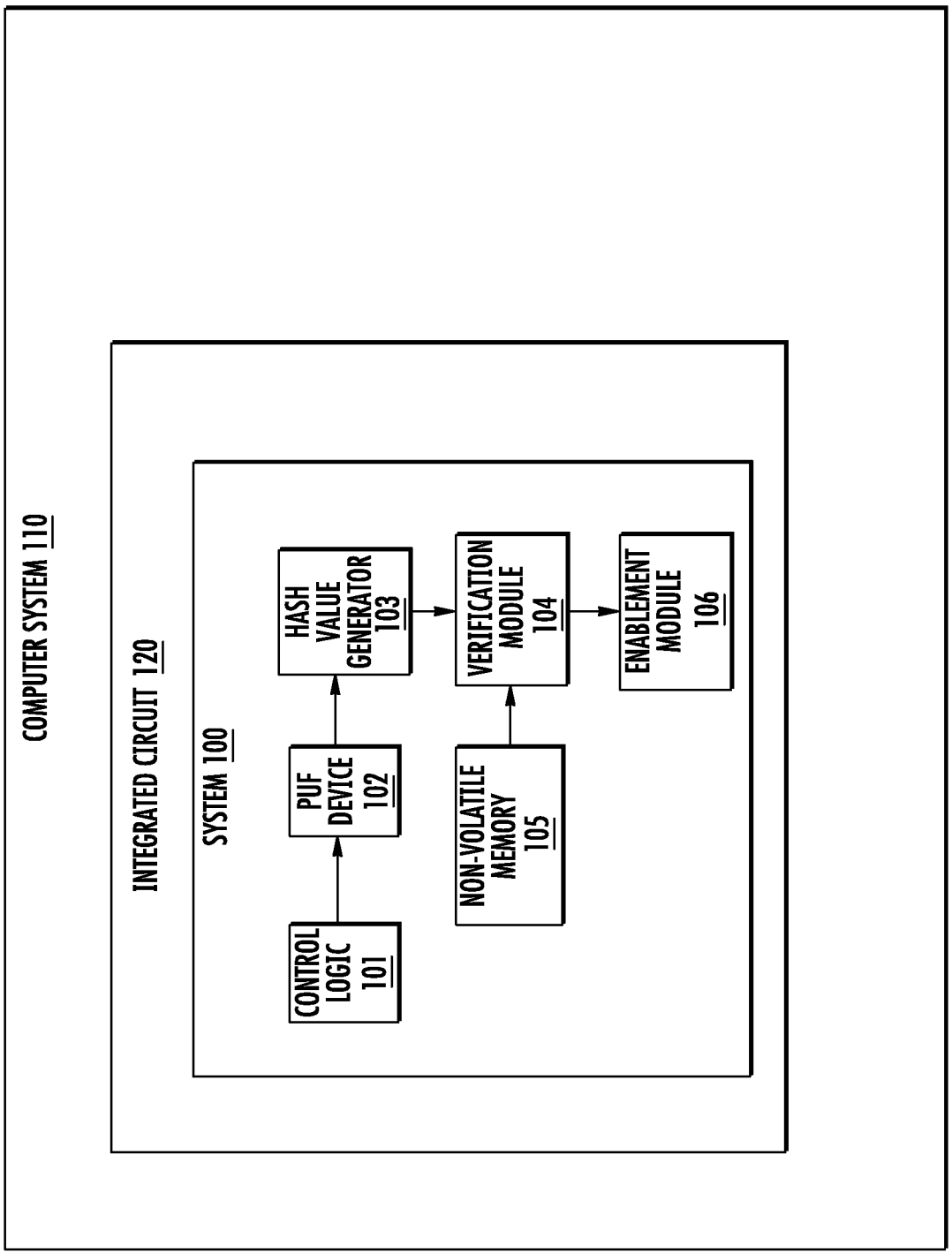
FIG. 1 illustrates a system for providing security in a computer system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to providing security in a computer system, in particular, to providing security in a computer system using countermeasures to frequency alteration attacks on ring oscillator based PUFs.

FIG. 1 illustrates a system 100 for providing security in a computer system 110 according to example implementations of the present disclosure. The computer system may include the system as shown. For example, the computer system may be equipped with the system. In another example, the computer system and the system may be two separate systems.

The system 100 may include one or more of each of a number of components, units or the like (generally "components") at least some of which may include or be implemented with logic circuits such as multiplexers, registers, arithmetic logic units, memory, microprocessors and the like. The system may be designed for any of a number of different applications, and may have particular applicability to provide countermeasures to frequency alteration attacks to the system and provide security in the computer system 110.

The computer system 110 may include a processor and a computer-readable storage medium or memory coupled to the processor, where the processor is configured to execute computer-readable program code including one or more computer programs stored in the memory. It will also be understood that one or more functions, and combinations of functions, may be implemented by special purpose electronic hardware-based systems and/or processors which perform the specified functions, or combinations of special purpose hardware and program code instructions.

In some examples, as shown, the system 100 is implemented in an integrated circuit 120. The system includes a control logic 101 and a PUF device 102. At startup of the computer system 110, the control circuit is configured to call the PUF device a preset plurality of times, e.g., 10 times, with an identical input value to generate a plurality of PUF values, e.g., multiple sequences of bit values. The PUF values are used as candidate identifiers of the integrated circuit. In this disclosure, an identifier of the integrated circuit is sometimes referred to as "a chip-ID."

In some examples, the PUF device 102 is configured to provide the candidate identifiers (PUF values) to a hash value generator 103. The hash value generator is configured to apply a hash function to the candidate identifiers to produce respective hash values and provide the respective hash values to a verification module 104.

In some examples, the verification module 104 is configured to access a reference hash value from a secure non-volatile memory 105, which is unchangeable by an unauthorized third party. The reference hash value is obtained from application of the hash function in the hash value generator 103 to an accepted identifier of the integrated circuit 120. The reference hash value can be stored in the non-volatile memory during an initial setup or calibration process of the integrated circuit. The verification module is configured to verify all of the respective hash values from the hash value generator using the reference hash value.

In some examples, the verification module 104 is configured to provide the verification results to an enablement module 106. The enablement module is configured to enable the computer system 110 to operate in a first mode when a respective hash value of the respective hash values is verified, or otherwise enable the computer system to operate in a second mode when none of the respective hash values is verified. The verified respective hash value is for a candidate identifier of the candidate identifiers that matches the accepted identifier, thus, the verified respective hash value is thereby construed as the accepted identifier.

Figure 2:
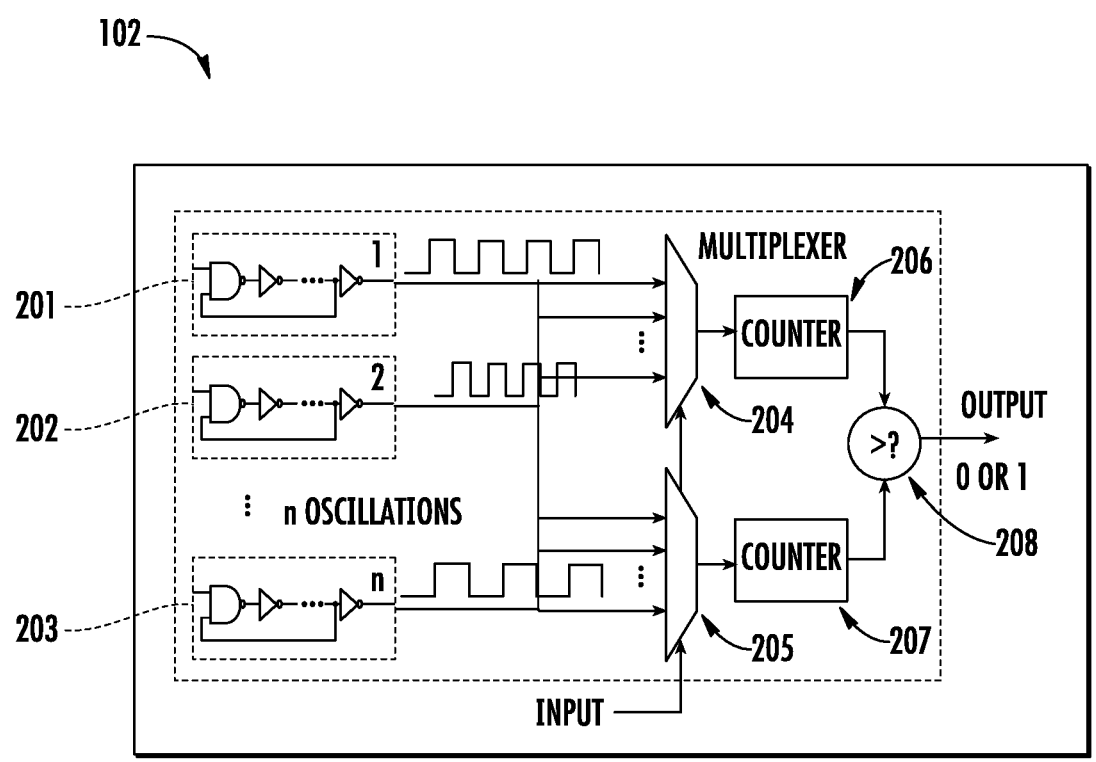
FIG. 2 illustrates a PUF device, according to various example implementations.

In some examples, the PUF device includes a plurality of ring oscillators (as shown in FIG. 2 below), and the identical input value of the PUF device 102 includes a sequence of pairs of identifiers of ring oscillators of the plurality of ring oscillators in the PUF device. For each of the preset plurality of times, the control logic 101 is configured to apply the identical input value in which each pair of identifiers in the sequence causes the PUF device to compare oscillation frequencies of a respective pair of the ring oscillators in the PUF device. Based on the comparison, the PUF device is configured to output a bit value indicating which oscillation frequency of the respective pair of the ring oscillators is larger. The bit value is one of a sequence of bit values output over the sequence of pairs of identifiers. The sequence of bit values is one of the plurality of PUF values corresponding to the identical input value.

In some examples, for each hash value of the respective hash values produced by the hash value generator 103, the verification module 104 is configured to compare the hash value to the reference hash value to determine whether the hash value matches (e.g., equals) the reference hash value and the hash value is thereby verified.

In some examples, when a respective hash value of the respective hash values is verified by the verification module 104, the enablement module 106 is configured to cause the computer system 110 to boot up in the first mode. In the first mode, the computer system is caused to at least load firmware and data into memory of the computer system, perform data authentication on the firmware and data using the accepted identifier, and perform a decrypt operation on the firmware and data with a valid key, which may depend chip-ID.

In some examples, when none of the respective hash values is verified by the verification module 104, the enablement module 106 is configured to cause the computer system 110 to boot up in the second mode. In the second mode, the computer system is caused to load the firmware and data into the memory of the computer system. In the second mode, the computer system is also caused to perform the data authentication on the firmware and data without the accepted identifier, and ignore any errors in the data authentication. In the second mode, the computer system is further caused to perform a decryption operation on the firmware and data with a preset invalid key. These activities are exactly the same as in the first operational mode, albeit their results are different. Also, optionally, in the second mode, the computer system is caused to report a security error to a user of the computer system after a preset delay. These steps can cause a significant delay in the possible detection that an attack was successful.

FIG. 2 illustrates the PUF device 102 according to various example implementations. As shown, in some examples, the PUF device includes n identically-designed ring oscillators, e.g., ring oscillators 201-203. Manufacturing variations within tolerances make the n ring oscillators slightly different, and these differences cannot be predicted. The physical differences of the n ring oscillators make them to oscillate at different frequencies. The different frequencies may vary with temperature and supply voltage, in which case a calibration or correction to the PUF values is needed.

In one example, the PUF device 102 also includes two multiplexers, e.g., the multiplexers 204 and 205. Each of the two multiplexers can select one ring oscillator from the n ring oscillators. The input value of the PUF device can include a sequence of pairs of identifiers of ring oscillators of the n ring oscillators. Based on the input value, the two multiplexers can select certain pairs of the ring oscillators. For example, based on one pair of identifiers in the input value, the multiplexer 204 can select the ring oscillator 201 and the multiplexer 205 can select the ring oscillator 203.

In one example, the PUF device 102 also includes two counters, e.g., the counters 206 and 207. Each counter measures the oscillation frequency of the ring oscillator selected by a multiplexer 204, 205. For example, the counter 206 can measure the oscillation frequency of the ring oscillator selected by the multiplexer 204, e.g., the ring oscillator 201, and the counter 207 can measure the oscillation frequency of the ring oscillator selected by the multiplexer 205, e.g., the ring oscillator 203. In one example, the counters measure the frequencies by counting the oscillation periods of the corresponding ring oscillators in a preset time period.

In one example, for each selected pair, e.g., the pair including the ring oscillators 201 and 203, the oscillation frequencies of the two ring oscillators measured by the counters 206 and 207 are compared at a comparator 208. For each comparison, the PUF device 102 outputs a bit value (e.g., 0 if the frequency of the ring oscillator measured by the counter 206 is less than the frequency of the ring oscillator measured by the counter 207, and 1 otherwise). Thus, if the input value includes a sequence of pairs of identifiers of ring oscillators of the n ring oscillators, the PUF device will perform a sequence of comparisons and output a sequence of bit values, which constructs a PUF value.

Note that if there are n ring oscillators, there are $n^2$ possible input values, but only $n \cdot (n-1)/2$ ordered pairs to compare. However, the results of certain sets of comparisons determine the outcome of other comparisons, which reduces the number of independent comparisons to $\log_2(n!) \approx 1.44 \cdot n \cdot \ln(n)$. In practical systems some frequencies of ring oscillators may be too close to be reliably distinguished, therefore, for certainty of operations and for high security, several hundred of ring oscillators may be needed in the PUF device 102.

In some examples, the accepted identifier is used as a component of a root cryptographic key of the computer system 110. Other secret information can be also customarily included in the root key generation, e.g. a key value stored in a hidden nonvolatile storage. These pieces of information can be "mixed" together, e.g., by a hash function, to produce a root cryptographic key of the computer system. The accepted identifier can also be used as a practically unique identifier of the chip, on which the PUF components are implemented. This chip-ID may be customarily kept in secret and not to compromise the secrecy of any dependent root key. Therefore, a one-way function, like a cryptographic hash function can be applied to the chip-ID to obtain a public ID of the chip.

The PUF device 102 can be used to generate the candidate identifier that is construed as the accepted identifier, and which, again, may be referred to as a chip-ID. As described above, this chip-ID may at times be used as component of a root cryptographic key of the computer system 110. To further illustrate example implementations of the present disclosure, the below description provides further information for various applications in which the PUF device is used to generate a chip-ID or a component of the root key of the computer system. For at least some of these applications, a fixed (often secret) series of inputs may be chosen, and the concatenated output bits (i.e., a PUF value) can form the chip-ID, or a component of the root key. The chip-ID can be unique to every chip or integrated circuit (at least at an extremely high probability). Digital fingerprints (cryptographic hash values) can be computed from the correct chip-ID and be stored in the non-volatile memory 105 as the reference has value. The verification module 104 can verify if all the computed chip-IDs are correct, because random circuit noise or frequency alteration attacks can alter the computed chip-IDs.

Oscillation signals can leak from the ring oscillators in the PUF device 102 through capacitive or inductive ways via electromagnetic (EM) emanations. The leaked signals can be measured on the power lines or on the connectors (pins) of the PUF device. By analyzing the leaked signals, an unauthorized third party can build a table of expected counter values of the ring oscillators, which helps the frequency alteration attacks. The frequency alteration attacks can also work without this knowledge, although using longer time.

The main information the unauthorized third party can get about the PUF device 102 is whether the generated PUF value is correct or not. When the unauthorized third party is able to change one or a few targeted oscillation frequencies of the ring oscillators in the PUF device, such that the generated PUF value becomes incorrect, the computer system 110 will not start up (boot up) normally. By observing abnormal startup or boot up behavior of the computer system, the unauthorized third party gains valuable information about the comparison structure of the PUF device. When the unauthorized third party collects enough pieces of such information, the correct PUF value (correct chip-ID) can be inferred.

In one example, interference can be injected via magnetic coils, capacitive plates by supply voltage modulation, load fluctuation on output pins or laser impulses. In another example, interference can be injected even by running certain programs with short loops on an internal microprocessor, when its supply voltage is fed by the same wires or when its operation causes the electric potential of the substrate to vary.

The unauthorized third party injects interference to a targeted ring oscillator in the PUF device 102 to affect its frequency. When this particular ring oscillator starts up under interference, it locks to this interference. At this point the unauthorized third party gradually tunes the interference signal to higher or lower frequencies, which the targeted ring oscillator follows, but other ring oscillators do not. By observing the boot up behavior of the computer system 110 under such attacks, single frequency comparison of the PUF can be checked and mapped.

In another example, fast and large (e.g., 5%) swings of the supply voltage cause certain ring oscillators in the PUF device 102 to oscillate at significantly higher or lower frequency, than under normal conditions. The frequency change can be significant, e.g., over 30% change of frequency. Not all the ring oscillators in the PUF device 102 are affected equally by the fast voltage swings. By measuring the leaked oscillation signals in response to various ripple patterns on the supply lines, the unauthorized third party can gain information about how to change the frequencies of certain groups of ring oscillators, while keeping others unaffected. The unauthorized third party can also collect information about how to manipulate the frequency relationships of the ring oscillators. By observing the boot up behavior of the computer system 110, the unauthorized third party gains information about which frequency comparisons are performed by the PUF device 102.

The unauthorized third party can force certain individual ring oscillator or groups of ring oscillators in the PUF device 102 to alter their frequencies, as described above. When the frequency changes of a certain ring oscillator or ring oscillators prevent the computer system 110 to boot up, the unauthorized third party learns that the attacked frequencies (and the corresponding ring oscillators) are used in the PUF device for comparisons and the frequency changes cause some comparisons to flip. By observing the boot up behavior of the computer system when different ring oscillators are attacked, the unauthorized third party can gain enough information to learn the generated PUF value, or at least can reduce its entropy such that an exhaustive search may reveal its true value. This makes direct attacks on the chip IDs and the root keys possible.

In some examples, the system 100 provides countermeasures to obfuscate responses of the computer system 110 to the frequency alteration attacks. The obfuscated responses can be observable by the unauthorized third party. Without the frequency alteration attacks, because the PUF computation is a noisy process and it may fail occasionally due to random circuit noise or environmental effects, if the generated chip-ID is incorrect, the computer system has to retry it. With a frequency alteration attack, a forced re-computation of the PUF values immediately tells the unauthorized third party that the attack succeeded (at least with a high probability) to affect at least one frequency comparison of ring oscillators in the PUF device 102. The unauthorized third party can also know that the affected frequency comparison is actually used to produce a PUF value.

In a first level countermeasure, the control logic 101 of the system 100 is configured to call the PUF device 102 a preset number of times (e.g. k=10 times) to perform the chip-ID generation process. If any one of the k computed chip-IDs is correct (verified by the stored digital fingerprint, e.g., the reference a hash value), the computer system 110 can use the correct chip-ID without revealing which computations of the k times, if any, failed. In one example, the control logic of the system is configured to call the PUF device to always perform all the k (e.g., 10) chip-ID computations, even when a correct chip-ID value has been computed early, e.g., in the first or second chip-ID computation of the k chip-ID computations. Otherwise the startup time variances of the computer system 110 may depend on the sequence of successes and failures of the PUF evaluation process. The startup timing variance may leak exploitable information to the unauthorized third party.

In some examples, if any one of the k computed chip-IDs is correct (when a computed hash value is verified by the verification module 104), the enablement module 106 is configured to cause the computer system 110 to boot up in a normal operation mode (the first mode as described above). In the normal operation mode, the computer system is caused to at least: load firmware and data into memory of the computer system; perform data authentication on the firmware and data using the accepted identifier; and decrypt the firmware and data.

Frequency alteration attacks are unreliable, that is, they only succeed sporadically. Some factors may affect the success of the frequency alteration attacks. For example, the circuit noise is unpredictable to the unauthorized third party but it may affect the oscillation frequencies of the ring oscillators in the PUF device 102. Also, the clock signals may have phase skew. Since the computer system 110 can work properly with one correct chip-ID, a successful attack must successfully attack all the k chip-ID computations and spoil all the k PUF values. If an attack has to be repeated k times to spoil all the k PUF values, almost certainly there will be one or more correct chip-ID computations among all the k PUF values. Therefore, the attacks have to be repeated many times to assure that all of the k attempts are successful to all the k chip-ID computations. In one example, if the attack succeeds 10% of the time, and k=10, the chance that all k computations of the chip-ID are spoiled by repeated attacks is $10^{-10}$, which makes it extremely unlikely. Thus, the first level countermeasure is effective.

In another example, a second level countermeasure can hide the information of whether or not the chip-ID generation totally fails (all of the k calls to the chip-ID computations produced wrong PUF values).

In some examples, if the chip-ID generation totally fails (when none of the computed hash values is verified by the verification module 104), the computer system 110 will not be functional without the correct chip-ID or without the correct root key. In this case, the enablement module 106 is configured to cause the computer system to boot up in a fake operation mode (the second mode described above). In the fake operation mode, the computer system is caused to load the firmware and data into the memory of the computer system. In the fake operation mode, the computer system is also caused to perform the data authentication on the firmware and data without the accepted identifier, and ignore any errors in the data authentication. In the fake operation mode, the computer system is further caused to perform a decryption operation on the firmware and data with a preset invalid key. Moreover, optionally, in the fake operation mode, the computer system is caused to report a security error to a user of the computer system after a preset delay at the end of the fake boot up procedure. In the fake operation mode, the computer system can perform all initialization work. The fake operation mode mimics the normal operation mode.

The effectiveness of the second level countermeasure depends on how well the fake operation mode can mimic the normal operation mode. Either with the lack of functionality in the fake operation mode, or with simple power analysis, or with timing analysis, the unauthorized third party could still find differences eventually. That is, the unauthorized third party can eventually detect if a frequency alteration attack successfully attacked the PUF device 102 so that the computer system 110 cannot work in the normal operation mode. Therefore the second level countermeasure can slow down the attacks on the PUF device, but it may not prevent all attacks. The slowdown can increase the time used by the unauthorized third party to detect that the frequency alteration attack successfully affected one or more ring oscillators in the PUF device from milliseconds to seconds. It is 3 orders of magnitude slowdown of the attacks on the PUF device.

The second level countermeasure can be combined with the first level countermeasure or can be used separately. Attacks on an unprotected PUF device to recreate the correct chip-ID may take weeks. By using the first level and second level countermeasures described above, frequency alteration attacks to recreate the correct chip-ID are increased to several years. By then the protected information may become irrelevant or worthless to the unauthorized third party. Note that the ring oscillators in every chip are different, so if one chip was attacked successfully (after years of trying), the lost secret information cannot be used to attack other chips faster. Also, the random manufacturing variations make the ring oscillators, and so the PUF devices, different in every deployed computer system. Thus, concurrently attacking many computer systems does not help the unauthorized third party. Successfully attacking one computer system takes a long time, and information gained from the successfully attacked computer system does not help to attack other computer systems.

Figure 3:
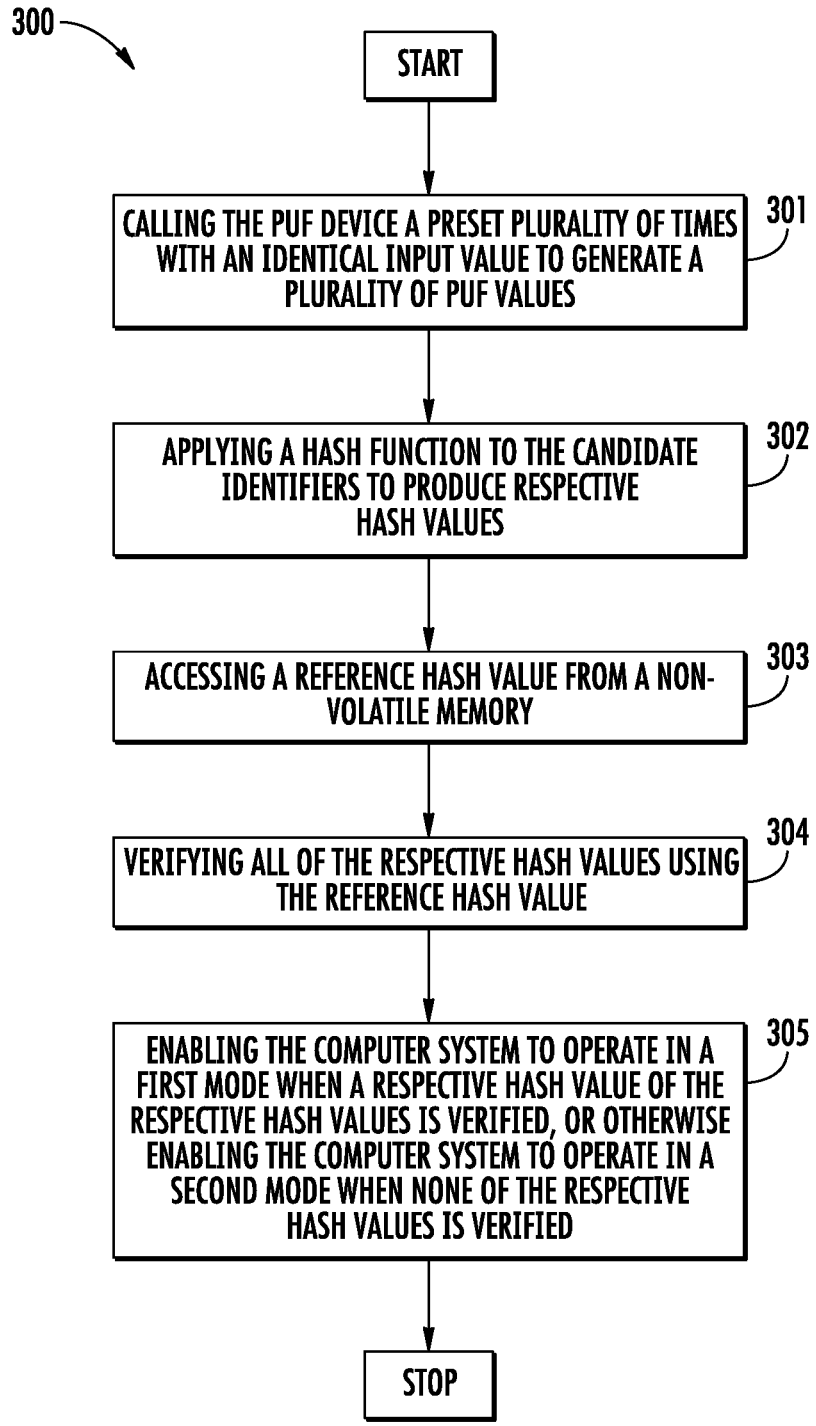
FIG. 3 is a flowchart illustrating various steps in a method of providing security in a computer system according to various example implementations.

FIG. 3 is a flowchart illustrating various steps in a method 300 of providing security in the computer system 110 according to various example implementations. The method is implemented by the system 100. The system is implemented in an integrated circuit 120 and includes a PUF device 102 including a plurality of ring oscillators, e.g., the ring oscillators 201-203. At startup of the computer system, at block 301, the method includes calling the PUF device a preset plurality of times with an identical input value to generate a plurality of PUF values. The PUF values are used as candidate identifiers of the integrated circuit. At block 302, the method includes applying a hash function to the candidate identifiers to produce respective hash values. At block 303, the method includes accessing a reference hash value from a non-volatile memory 105. The reference hash value is from application of the hash function to an accepted identifier of the integrated circuit. At block 304, the method includes verifying all of the respective hash values using the reference hash value. At block 305, the method includes enabling the computer system to operate in a first mode when a respective hash value of the respective hash values is verified, or otherwise enabling the computer system to operate in a second mode when none of the respective hash values is verified. The verified respective hash value is for a candidate identifier of the candidate identifiers that matches and is thereby construed as the accepted identifier.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system being implemented in an integrated circuit and comprising a physical unclonable function (PUF) device and one or more logic circuits that at startup of the computer system are configured to at least:
   call the PUF device a preset plurality of times with an identical input value to generate a plurality of PUF values that are used as candidate identifiers of the integrated circuit;
   apply a hash function to the candidate identifiers to produce respective hash values;
   access a reference hash value from a non-volatile memory, the reference hash value being from application of the hash function to an accepted identifier of the integrated circuit;
   verify all of the respective hash values using the reference hash value; and
   enable the computer system to boot up in a first mode when a respective hash value of the respective hash values is verified, or otherwise enable the computer system to boot up in a second mode when none of the respective hash values is verified, the respective hash value being for a candidate identifier of the candidate identifiers that matches and is thereby construed as the accepted identifier;
   wherein the first mode is a normal operation mode in which the computer system is caused to at least:
   load firmware and data into memory of the computer system;
   perform data authentication on the firmware and data using the accepted identifier; and
   perform a decryption operation on the firmware and data with a key, and
   wherein the second mode is a fake operation mode that mimics the normal operation mode in which the computer system is caused to at least:
   load the firmware and data into the memory of the computer system;
   perform the data authentication on the firmware and data without the accepted identifier, and ignore any errors in the data authentication; and
perform the decryption operation on the firmware and data with a preset invalid key.

2. The system of claim 1, wherein the PUF device includes a plurality of ring oscillators, and the input value of the PUF device includes a sequence of pairs of identifiers of ring oscillators of the plurality of ring oscillators.

3. The system of claim 2, wherein the one or more logic circuits being configured to call the PUF device includes for each of the preset plurality of times, the one or more logic circuits being configured to apply the identical input value in which each pair of identifiers in the sequence causes the PUF device to compare oscillation frequencies of a respective pair of the ring oscillators and output a bit value indicating which is larger, the bit value being one of a sequence of bit values output over the sequence of pairs of identifiers.

4. The system of claim 3, wherein the sequence of bit values is one of the plurality of PUF values corresponding to the input value.

5. The system of claim 2, wherein the PUF device further includes two multiplexers, wherein each multiplexer is configured to select one ring oscillator from the plurality of ring oscillators to thereby form a pair of ring oscillators.

6. The system of claim 5, wherein the PUF device further includes two counters configured to measure the oscillation frequencies of the pair of ring oscillators.

7. The system of claim 6, wherein the PUF device further includes a comparator configured to compare the oscillation frequencies of the pair of ring oscillators.

8. The system of claim 1, wherein the one or more logic circuits being configured to verify all of the respective hash values includes for each hash value of the respective hash values, the one or more logic circuits being configured to compare the hash value to the reference hash value to determine whether the hash value matches the reference hash value and the hash value is thereby verified.

9. The system of claim 1, wherein the accepted identifier is used as a component of a root cryptographic key of the computer system.

10. The system of claim 1, wherein the one or more logic circuits being configured to enable the computer system to operate in the second mode includes being configured to cause the computer system to boot up in the second mode in which the computer system is caused to report a security error to a user of the computer system after a preset delay.

11. A method implemented by a system for providing security in a computer system, the system being implemented in an integrated circuit and comprising a physical unclonable function (PUF) device, at startup of the computer system:
   calling the PUF device a preset plurality of times with an identical input value to generate a plurality of PUF values that are used as candidate identifiers of the integrated circuit;
   applying a hash function to the candidate identifiers to produce respective hash values;
   accessing a reference hash value from a non-volatile memory, the reference hash value being from application of the hash function to an accepted identifier of the integrated circuit;
   verifying all of the respective hash values using the reference hash value; and
   enabling the computer system to boot up in a first mode when a respective hash value of the respective hash values is verified, or otherwise enabling the computer system to boot up in a second mode when none of the respective hash values is verified, the respective hash value being for a candidate identifier of the candidate identifiers that matches and is thereby construed as the accepted identifier;
wherein the first mode is a normal operation mode in which the computer system is caused to at least:
   load firmware and data into memory of the computer system;
   perform data authentication on the firmware and data using the accepted identifier; and
   perform a decrypt operation on the firmware and data with a key, and
wherein the second mode is a fake operation mode that mimics the normal operation mode in which the computer system is caused to at least:
   load the firmware and data into the memory of the computer system;

perform the data authentication on the firmware and data without the accepted identifier, and ignore any errors in the data authentication; and perform the decryption operation on the firmware and data with a preset invalid key.

12. The method of claim 11, wherein the PUF device includes a plurality of ring oscillators, and the input value of the PUF device includes a sequence of pairs of identifiers of ring oscillators of the plurality of ring oscillators.

13. The method of claim 11, wherein calling the PUF device includes for each of the preset plurality of times, applying the identical input value in which each pair of identifiers in the sequence causes the PUF device to compare oscillation frequencies of a respective pair of the ring oscillators and output a bit value indicating which is larger, the bit value being one of a sequence of bit values output over the sequence of pairs of identifiers.

14. The method of claim 13, wherein the sequence of bit values is one of the plurality of PUF values corresponding to the input value.

15. The method of claim 12, wherein the PUF device further includes two multiplexers, wherein each multiplexer is configured to select one ring oscillator from the plurality of ring oscillators to thereby form a pair of ring oscillators.

16. The method of claim 15, wherein the PUF device further includes two counters configured to measure the oscillation frequencies of the pair of ring oscillators.

17. The method of claim 16, wherein the PUF device further includes comparator configured to compare the oscillation frequencies of the pair of ring oscillators.

18. The method of claim 5, wherein verifying all of the respective hash values includes for each hash value of the respective hash values, comparing the hash value to the reference hash value to determine whether the hash value matches the reference hash value and the hash value is thereby verified.

19. The method of claim 5, wherein the accepted identifier is used as a component of a root cryptographic key of the computer system.

20. The method of claim 11, wherein enabling the computer system to operate in the second mode includes causing the computer system to boot up in the second mode in which the computer system is caused to report a security error to a user of the computer system after a preset delay.

* * * * *